G. S. FALLOW.
SCREW THREAD GAGE.
APPLICATION FILED MAR. 16, 1918.
1,392,313.
Patented Oct. 4, 1921.
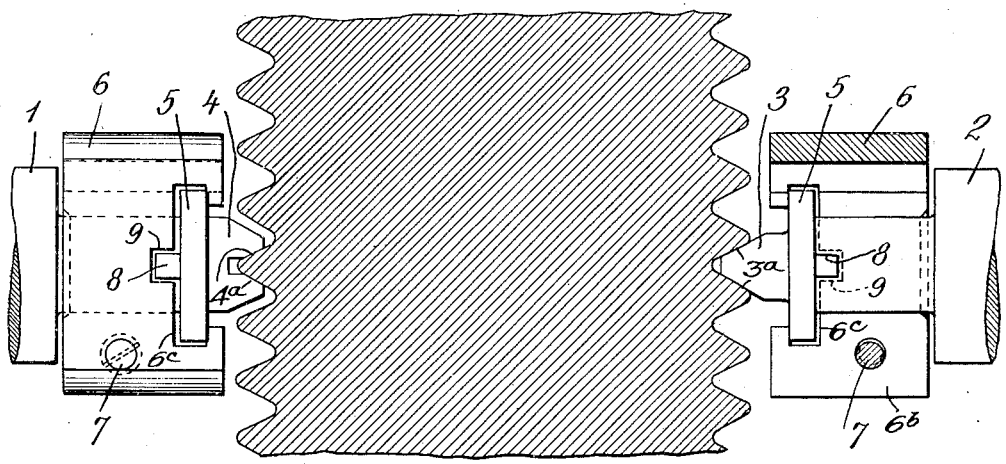
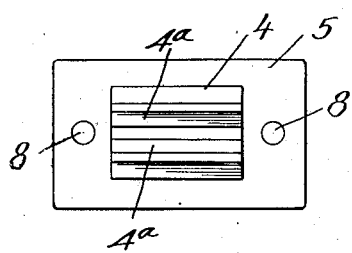
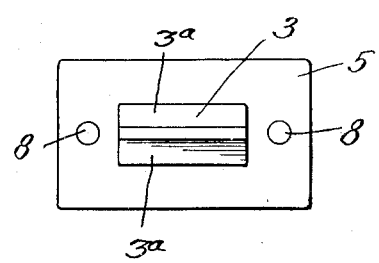
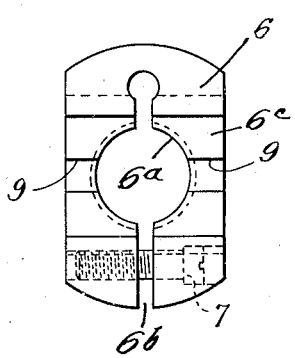
INVENTOR
Gavin S. Fallow
BY S. Jay Teller
ATTORNEY

UNITED STATES PATENT OFFICE.

GAVIN S. FALLOW, OF WETHERSFIELD, CONNECTICUT, ASSIGNOR TO PRATT & WHITNEY COMPANY, OF NEW YORK, N. Y., A CORPORATION OF NEW JERSEY.

SCREW-THREAD GAGE.

1,392,313.      Specification of Letters Patent.      Patented Oct. 4, 1921.

Application filed March 16, 1918. Serial No. 222,869.

*To all whom it may concern:*

Be it known that I, GAVIN S. FALLOW, a citizen of the United States, residing at Wethersfield, in the county of Hartford and State of Connecticut, have invented certain new and useful Improvements in Screw-Thread Gages, of which the following is a specification.

This invention relates to devices for use in connection with a measuring machine or in connection with micrometer calipers for measuring the pitch diameters of threaded bodies. The object of the invention is to provide simple devices for this purpose which are adapted to be readily applied to a measuring machine or micrometer calipers of standard construction, which are capable of readily positioning themselves in accordance with the thread, and which are adapted to give extremely accurate results.

In the accompanying drawing I have shown the embodiment of the invention which I now deem preferable, but it will be understood that the invention may be embodied in other ways without departing from the spirit thereof as set forth in the appended claims.

Of the drawing, which shows the thread gage on an enlarged scale;

Figure 1 is a plan view partly in section.

Fig. 2 is a detail view of one of the measuring points.

Fig. 3 is a detail view of the other measuring point.

Fig. 4 is a detail view of one of the two holding devices for the measuring points.

Referring to the drawings, 1 and 2 represent the two opposed jaws or plungers of a measuring machine, these plungers being reduced at their ends, as shown. The two plungers have parallel flat end faces and the reduced end portions of the plungers are of uniform cross section throughout, preferably being cylindrical, as shown. Coöperating respectively with the plungers are two opposed measuring devices 3 and 4, each comprising a plate 5 having its rear or outermost surface ground so as to closely engage and fit the inner end surface of the corresponding plunger. The two devices carry thread engaging points which are respectively male and female. The male point 3 is provided with two plane surfaces $3^a$ which are inclined to each other at an angle corresponding to the shape of the threads, the line of intersection of the two planes being parallel with the rear surface of the corresponding plate 5. The female point 4 is provided with two plane surfaces $4^a$ which are inclined to each other at a reëntrant angle corresponding to the shape of the threads, the line of intersection of the two planes being parallel with the rear surface of the corresponding plate 5. The outer surfaces $4^a$ of the female thread-engaging point 4 are so positioned as to clear the threads, as shown in Fig. 1. I have illustrated the measuring devices as adapted for measuring Whitworth threads and in this case the angle between the two plane surfaces of each measuring point is 55°. It will be understood, however, that the invention it not limited to Whitworth threads and that by providing an angle of 60°, or such other angle as may be required, threads of any standard form may be measured.

To secure a zero reading, the plungers 1 and 2 are moved to bring the two measuring devices into engagement with each other, the point of the device 3 entering the groove in the device 4. When the two measuring devices are thus engaged a zero reading is obtained. The plungers are then separated and the devices 3 and 4 are brought into contact with the screw to be measured, as shown in Fig. 1. The two measuring devices are freely movable on the end surfaces of the plungers and can therefore readily adapt themselves so as to closely fit the threads. The devices having thus been properly adjusted, a reading is taken and this reading is the pitch diameter.

The two measuring devices can be held on the plungers of the measuring machine by hand or the devices can be magnetized so that they will automatically adhere to the plungers. Preferably, however, I provide a mechanical holder such as is shown in Figs. 1 and 4. As illustrated, this holder is a block 6 having a central aperture $6^a$ adapted to receive the reduced end of the plunger. The block is slotted from one side, as shown at $6^b$, and is provided with a screw 7 extending through transverse alined apertures in the block whereby it may be clamped in place on the plunger. The block is provided with a transverse T-slot $6^c$ adapted to loosely receive the plate 5 and the measuring point of one of the measuring devices 3 or 4. The T-slot is of sufficient size to permit the measuring device to move relative to the block as required. It will be clear that the measuring device may adjust itself in any direction perpendicular to the plunger axis and also that it may adjust itself angularly about any axis within a limited range parallel to or coinciding with the plunger axis.

Preferably each measuring device is provided near its ends with rearward extending pins 8, 8 one of which is adapted to engage the corresponding plunger and prevent the measuring device from falling out. In order that the measuring devices may be put in place in the holder and removed, the holder is provided in the rear wall of the slot 6ᶜ with notches 9, 9 which permit the pins to pass. It will be clear that if the measuring device be put in place in the holder before the holder is clamped to the plunger the pins will prevent the removal of the measuring device until the holder is released from the plunger.

What I claim is:

1. A thread gage comprising in combination, two measuring devices adapted to be placed in opposed positions on the respective opposed plungers of a measuring machine, which plungers have portions adjacent the ends that are of uniform cross section throughout, the said devices being provided respectively with male and female thread engaging points and being constructed to be movable transversely of the plunger axes, and holders adapted to engage the sides of the plungers for holding the respective measuring devices in place on the plungers while permitting them to automatically adjust themselves transversely.

2. A thread gage comprising in combination, two measuring devices adapted to be placed in opposed positions in engagement respectively with the opposed plungers of a measuring machine, which plungers have portions adjacent the ends that are of uniform cross section throughout, the said devices being provided respectively with male and female thread engaging points and having flat surfaces adapted to engage the flat end surfaces of the corresponding plungers, and holders adapted to engage the sides of the plungers for holding the respective measuring devices in place on the plungers while permitting them to automatically adjust themselves transversely.

3. The combination of a measuring device adapted to be placed in engagement with the plunger of a measuring machine, the said device being provided with thread engaging points and having a flat surface adapted to engage the flat end surface of the plunger, and a holder for holding the said measuring device in place on the plunger while permitting it to automatically adjust itself transversely, the said holder comprising a block having an aperture to receive the plunger and having a transverse slot to receive the measuring device.

4. The combination of a measuring device adapted to be placed in engagement with the plunger of a measuring machine, the said device being provided with thread engaging points and having a flat surface adapted to engage the flat end surface of the plunger, and a holder for holding the measuring device in place on the plunger while permitting it to automatically adjust itself, the said holder comprising a split block having an aperture to receive the plunger, and a screw for clamping the block to the plunger.

5. The combination of a measuring device adapted to be placed in engagement with the plunger of a measuring machine, the said device being provided with thread-engaging points and having a flat surface adapted to engage the flat end surface of the plunger, a holder for holding the measuring device in place on the plunger while permitting it to automatically adjust itself, the said holder comprising a block having a transverse slot to receive the measuring device, and pins carried by the measuring device to prevent its movement through the slot.

6. The combination of a measuring device adapted to be placed in engagement with the plunger of a measuring machine, the said device being provided with thread-engaging points and having a flat surface adapted to engage the flat end surface of the plunger, a holder for holding the measuring device in place on the plunger while permitting it to automatically adjust itself, the said holder comprising a block having a transverse slot to receive the measuring device and having notches in the bottom wall of the slot, and pins carried by the measuring device and movable through the notches, the pins engaging the plunger when the holder is in place.

7. The combination of the two opposed plungers of a measuring machine, and two opposed measuring devices engaging the respective plungers and provided respectively at their inner sides with male and female thread-engaging points adapted to fit each other so that a zero point can be established by moving the plungers so as to bring the said points together, the engagement between the two measuring devices and the respective plungers permitting the said devices to independently adjust themselves in any direction perpendicular to the plunger axes or angularly about any axis within a limited range parallel to or coinciding with the plunger axes.

8. The combination of the two opposed plungers of a measuring machine, which plungers have flat parallel end surfaces, and two opposed measuring devices provided at their outer sides with flat surfaces in engagement respectively with the corresponding flat surfaces of the plungers and provided respectively at their inner sides with male and female thread-engaging points adapted to fit each other so that a zero point can be established by moving the plungers so as to bring the said points together, the flat surface engagement between the two measuring devices and the respective plungers permitting the said devices to independently adjust themselves in any direction perpendicular to the plunger axes or angularly about any axis within a limited range parallel to or coinciding with the plunger axes.

9. The combination of the two opposed plungers of a measuring machine, which plungers have flat parallel end surfaces and have portions adjacent the ends of uniform cross section throughout, two opposed measuring devices provided at their outer sides with flat surfaces in engagement respectively with the corresponding flat surfaces of the plungers and provided respectively at their inner sides with male and female thread-engaging points adapted to fit each other so that a zero point can be established by moving the plungers so as to bring the said points together, and holders engaging the sides of the plungers for holding the respective measuring devices in place while permitting the said devices to independently adjust themselves in any direction perpendicular to the plunger axes or angularly about any axis within a limited range parallel to or coinciding with the plunger axes.

10. The combination of the two opposed plungers of a measuring machine, two opposed measuring devices carried respectively by the plungers, the said devices being provided respectively with male and female thread engaging points and having flat surfaces engaging the flat end surfaces of the corresponding plungers, and holders for holding the respective measuring devices in place on the plungers while permitting them to automatically adjust themselves transversely, each holder comprising a block having an aperture which receives the corresponding plunger and having a transverse slot which receives the corresponding device.

11. The combination of the two opposed plungers of a measuring machine, two opposed measuring devices carried respectively by the plungers, the said devices being provided respectively with male and female thread engaging points and having flat surfaces engaging the flat end surfaces of the corresponding plungers, holders for holding the respective measuring devices in place on the plungers while permitting them to automatically adjust themselves transversely, each holder comprising a block having a transverse slot which receives the corresponding device and having notches in the bottom wall of the slot, and pins carried by each device and movable through the notches, the pins engaging the corresponding plunger and preventing displacement of the device.

In testimony whereof, I hereto affix my signature.

GAVIN S. FALLOW.